US008780263B2

United States Patent
Orf

(10) Patent No.: US 8,780,263 B2
(45) Date of Patent: Jul. 15, 2014

(54) BALANCED MOUNTING ARRANGEMENT FOR, AND METHOD OF, STEADILY SUPPORTING A MOTION-SENSITIVE, IMAGE CAPTURE DEVICE

(75) Inventor: Hans Robert Orf, Simi Valley, CA (US)

(73) Assignee: The Tiffen Company LLC, Hauppauge, NY (US)

( * ) Notice: Subject to any disclaimer, the term of this patent is extended or adjusted under 35 U.S.C. 154(b) by 417 days.

(21) Appl. No.: 12/956,369

(22) Filed: Nov. 30, 2010

(65) Prior Publication Data

US 2011/0164173 A1 Jul. 7, 2011

Related U.S. Application Data

(60) Provisional application No. 61/292,004, filed on Jan. 4, 2010.

(51) Int. Cl.
*H04N 5/225* (2006.01)
*G03B 17/00* (2006.01)
*F16M 13/00* (2006.01)
*F16M 13/04* (2006.01)
*H04M 1/04* (2006.01)

(52) U.S. Cl.
CPC ......... *H04N 5/2252* (2013.01); *F16M 2200/04* (2013.01); *F16M 13/00* (2013.01); *H04M 1/04* (2013.01); *F16M 13/04* (2013.01)
USPC ........... 348/373; 348/374; 348/376; 396/420; 396/421; 353/243

(58) Field of Classification Search
USPC ................................................ 348/373–376
See application file for complete search history.

(56) References Cited

U.S. PATENT DOCUMENTS

| 2,007,215 | A | | 7/1935 | Remey | |
|---|---|---|---|---|---|
| 5,098,182 | A | | 3/1992 | Brown | |
| 5,187,744 | A | * | 2/1993 | Richter | 379/449 |
| 5,243,370 | A | * | 9/1993 | Slater | 352/243 |
| 5,742,859 | A | * | 4/1998 | Acker | 396/419 |
| 6,425,697 | B1 | * | 7/2002 | Potts et al. | 396/426 |
| 7,936,984 | B2 | * | 5/2011 | Greb et al. | 396/55 |
| 8,007,188 | B2 | * | 8/2011 | Orf | 396/419 |
| D656,175 | S | * | 3/2012 | Fong | D16/244 |
| D687,879 | S | * | 8/2013 | Greenthal | D16/242 |
| 2004/0179835 | A1 | | 9/2004 | McKay | |
| 2004/0233389 | A1 | * | 11/2004 | Bruggaier | 352/243 |
| 2005/0098692 | A1 | * | 5/2005 | Yang | 248/163.1 |
| 2005/0122424 | A1 | * | 6/2005 | Overstreet | 348/373 |
| 2005/0196162 | A1 | * | 9/2005 | Mootz et al. | 396/428 |

(Continued)

FOREIGN PATENT DOCUMENTS

| CN | 1725096 | * | 1/2006 | ............ H04N 5/225 |
|---|---|---|---|---|
| TW | 20080210712 U | | 1/2009 | |

*Primary Examiner* — Hung Lam
(74) *Attorney, Agent, or Firm* — Kirschstein, et al.

(57) ABSTRACT

A balanced mounting arrangement stably supports a motion-sensitive, image capture device, and includes a mount for holding the device during image capture, and a handheld equipoising structure having a support platform on which the mount and the held device are mounted during image capture, a bottom counterweight below the platform, and a curved arm extending along an arcuate path between the platform and the counterweight. A weight component is mounted on, and is movable relative to and along, the curved arm to adjust a vertical balance position of the arrangement.

18 Claims, 5 Drawing Sheets

(56) References Cited

U.S. PATENT DOCUMENTS

2006/0262274 A1 11/2006 Brown et al.
2006/0263082 A1 11/2006 Brown
2006/0285844 A1 12/2006 Hershenzon
2007/0177866 A1* 8/2007 Fujimoto ..................... 396/376
2007/0283634 A1 12/2007 Hourihan
2011/0090300 A1* 4/2011 Chong et al. ................. 348/14.1

* cited by examiner

BALANCED MOUNTING ARRANGEMENT FOR, AND METHOD OF, STEADILY SUPPORTING A MOTION-SENSITIVE, IMAGE CAPTURE DEVICE

This application claims priority to U.S. Provisional Patent Application Ser. No. 61/292,004, filed Jan. 4, 2010.

BACKGROUND OF THE INVENTION

This invention generally relates to a balanced mounting arrangement for, and a method of, steadily supporting motion-sensitive, image capture devices, such as stand-alone image capture devices, e.g., ultra-lightweight cameras, web cameras and camcorders, as well as other multiple use devices, such as cellular telephones, personal digital assistants, media players, game controllers, and like devices in which image capture capability has been incorporated and, more particularly, relates to isolating all such devices from unwanted motion during image capture.

Still picture and motion picture (video) cameras have, at some time during their use, been handheld by a human operator whose inherent instability tended to produce blurred still and moving images. In recent years, ultra-lightweight cameras, such as web cameras weighing less than one pound, have been developed, and the current ultra-lightweight cameras are so compact and light that they have even been incorporated into other multiple use devices, such as cellular telephones, personal digital assistants, media players, game controllers and like handheld devices. In addition to the traditional unsteadiness of a handheld camera, these handheld devices were being operated by amateur photographers, still further resulting in unstable and often unacceptable still and video images, especially during ambulatory operation.

With the increasing popularity of handheld cellular telephones with built-in still and video image capture capability, it has become more and more desirable to rigidly support such handheld devices so that the images that they capture are stable and free from unwanted movement or vibration while the image is being acquired. Yet, the known handheld devices have not been directly integrated with the capability for such devices to be mounted onto industry standard camera and video equipment mounting platforms, such as tripods and/or handheld equipoising supports. Hence, this readily available industrial equipment cannot be used to help stabilize and/or manipulate the handheld devices.

Current methods of holding/mounting such handheld devices have been geared towards non-image capture applications. For example, some handheld devices have been equipped with global positioning systems, and have been mounted in/on vehicles or other forms of transportation by adjustable mechanisms that allow the handheld devices to be desirably positioned along one or more axes relative to a mounting platform for convenient operation by, or orientation that faces, the user. These adjustable mechanisms typically incorporated a positionable tripod mount, a semi-rigid bendable gooseneck mount, a ball end swivel mount, or other types of multi-jointed or adjustable mechanism that was connected between the handheld device and the mounting platform.

As desirable as such adjustable mechanisms have been in non-image capture applications, they are not well suited for image capture applications. For example, the known adjustable mechanisms lacked the capability to rigidly fix and fixedly orient an image plane of the handheld device perpendicularly to the mounting platform. If the image plane was not perpendicular to the mounting platform, then a handheld equipoising support, for example, would need to be operated at an undesirable off-axis orientation in order to obtain straight on or level images. As for tripods, level indicators would not be accurate with respect to the orientation of the image to be acquired. Existing multi jointed or adjustable mechanisms have been prone to movement or vibration due to the flexible, movable nature of the multi-part construction. Such potential vibration or movement of the orientation of the device was detrimental to stable image capture, especially when the device was in motion or subjected to external forces, such as wind.

Thus, the known adjustable mechanisms have failed to effectively and satisfactorily eliminate the problems of instability encountered in connection with operation of the ever-lighter, digital, still and motion, cameras that have been developed, and it therefore is desirable to furnish a balanced mounting arrangement particularly well suited to the special requirements of ultra-lightweight, handheld, digital devices, particularly consumer-operated video cameras and like devices, e.g., those incorporated into cellular telephones, personal digital assistants, media players, game controllers, and like handheld devices in which image capture capability has been incorporated.

SUMMARY OF THE INVENTION

One aspect of this invention is directed to a balanced mounting arrangement for steadily and stably supporting a motion-sensitive, image capture device on a support, preferably a handheld equipoising structure. The device is operative for capturing an image over a field of view along an optical axis perpendicular to an image plane. The device may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated.

The mounting arrangement includes a mount having a holder for holding the device during image capture, and a fixed base integral with, or connected to, the holder. The base is immovable relative to the holder and has a bottom surface that lays in a base plane perpendicular to the image plane when the base is supported by the support in a supported orientation. The base is operative for steadily positioning the holder and the device on the support in the supported orientation during the image capture. The capability of rigidly fixing the orientation or image plane of the handheld device with respect to the support avoids the capture of blurry images.

Advantageously, the holder has a plurality of arms for detachably gripping a periphery of the device. Preferably, the arms are constituted of a resilient material, such as synthetic plastic or metal. The arms are spaced away from, and do not block, the field of view, or interfere with any functions of the device, i.e., buttons, connector ports, battery replacement. The holder may be customized to hold one or more physical models of the device, or may be adapted to hold a plurality of different devices.

The base is advantageously provided with an insert having an internally threaded passage for threaded engagement with an externally threaded stud extending away from the support in the supported orientation during the image capture. The stud is preferably an industry standard ¼ inch-20 threaded mounting stud to enable the mount to be readily mounted on industry standard camera and video equipment mounting platforms, such as tripods and/or equipoising supports.

The base is also advantageously provided with an anti-rotation index hole for receiving an index pin extending away from the support in the supported orientation during the image capture. This feature insures that the handheld device is mounted and maintained without rotation in the correct orientation with respect to the camera mounting equipment. Unwanted rotation or movement of the handheld device during abrupt movements or re-positioning of the equipment is prevented. The holder and the base are preferably, but need not be, mirror symmetrical relative to a central plane. The insert and the index hole preferably lay in the central plane. The holder may also be designed such that it is off axis with respect to the base to accommodate special mounting requirements, or to align the optical centerline of the image capture device to the geometrical centerline of the mount.

The mount supports the device in a low mass, compact mounting profile. Without this capability, the mounting of the handheld device might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

In accordance with this invention, the handheld equipoising support structure includes a platform on which the device is mounted, a bottom counterweight below the platform, an arcuate arm extending between the platform and the bottom counterweight, and a weight component mounted on, and movable relative to and along, the arcuate arm, and preferably along a pair of arcuate arm portions. The weight component can be raised and lowered in elevation to adjust a vertical balance position of the entire arrangement.

Still another aspect of this invention is directed to a method of balancing a mounting arrangement in which a motion-sensitive, image capture device is supported on a handheld equipoising support, the method being performed by capturing an image with the device over a field of view along an optical axis perpendicular to an image plane, holding and steadily positioning the device on the support during image capture, and by moving a weight component on and along the support prior to image capture to balance the entire arrangement.

Thus, the handheld devices are rigidly supported and balanced such that the images that they capture are stable and free from unwanted movement or vibration while the image is being acquired. Readily available industrial equipment can be used to help stabilize and/or manipulate the handheld devices.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 4:
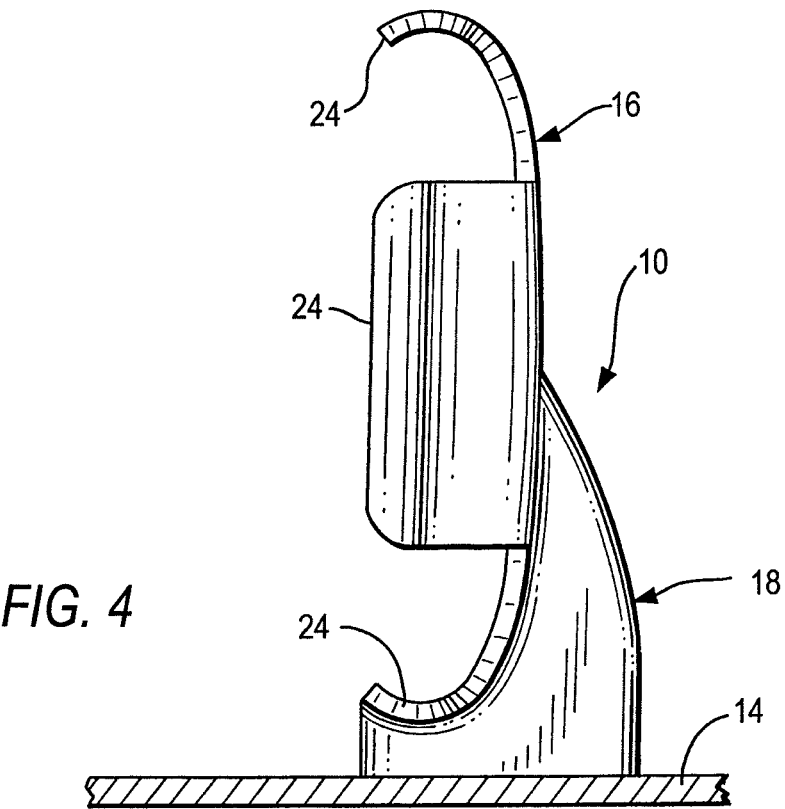
FIG. 4 is an upright side elevational view of the stabilized mount of FIG. 1 without the device.
Figure 5:
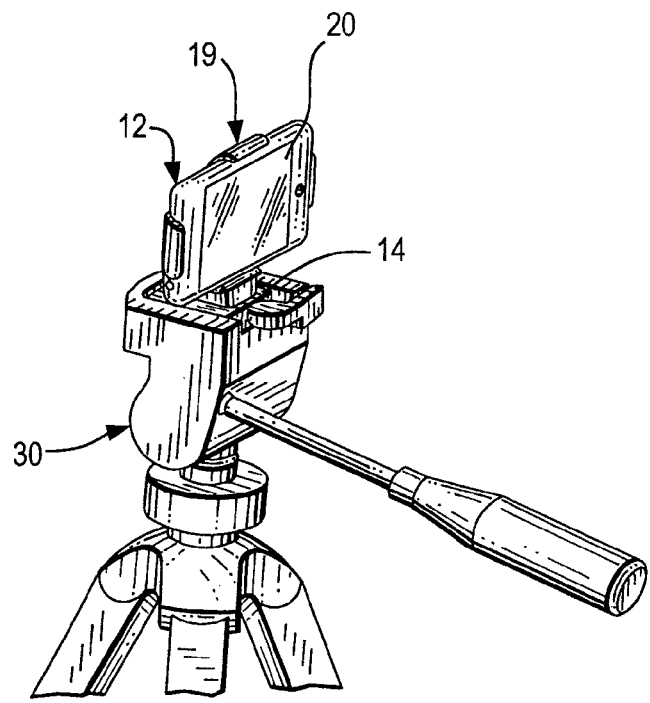
FIG. 5 is a reduced-scale, broken-away, perspective view of the stabilized mount of FIG. 1 on a tripod.
Figure 6:
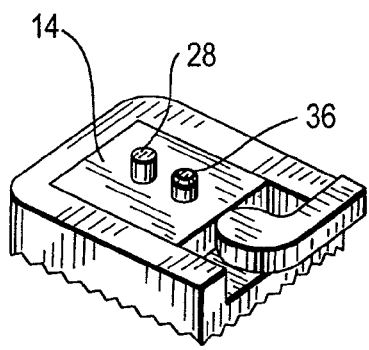
FIG. 6 is a perspective view of a detail of FIG. 5.
Figure 7:
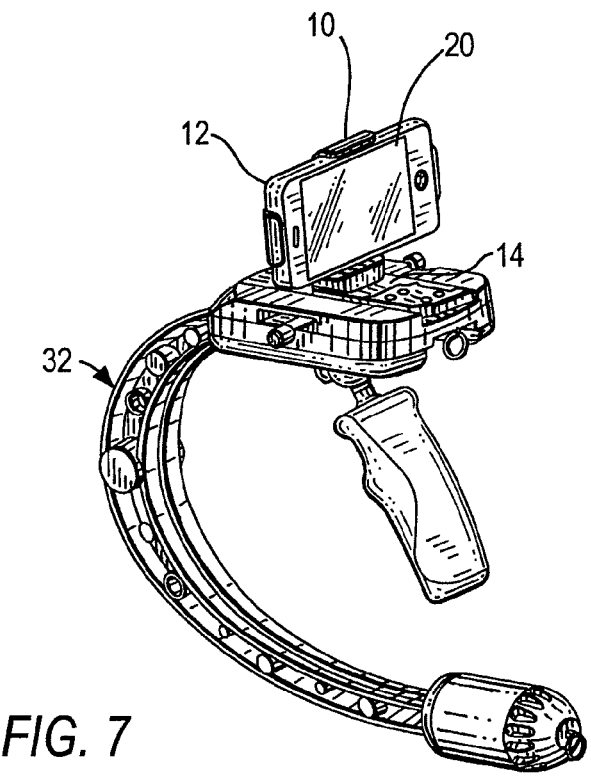
FIG. 7 is a reduced-scale, perspective view of the stabilized mount of FIG. 1 on one embodiment of a handheld equipoising support structure.

Referring now to the drawings, reference numeral 10 generally identifies a stabilized mount of a mounting arrangement for steadily and stably supporting a motion-sensitive, image capture device 12 on various supports 14 (see FIGS. 4-9). The device 12 is operative for capturing an image over a field of view along an optical axis perpendicular to an image plane. The device 12 may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated. The support 14 is preferably a handheld equipoising structure 32 or 40 (FIGS. 7-9), but may be a tripod 30 (FIG. 5), or a table or countertop (FIG. 4).

Figure 1:
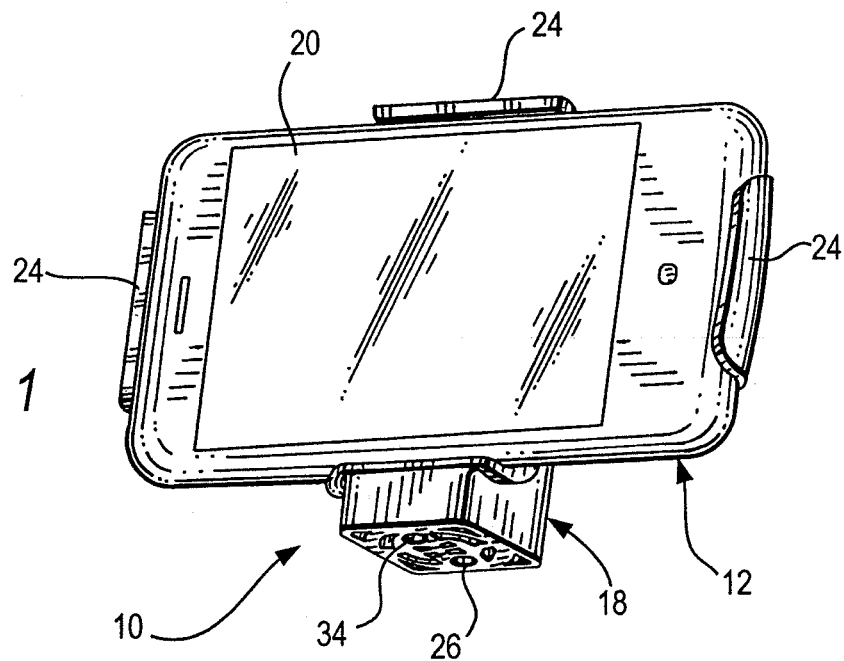
FIG. 1 is a front perspective view of a stabilized mount in which a multiple use, handheld device is held.
Figure 2:
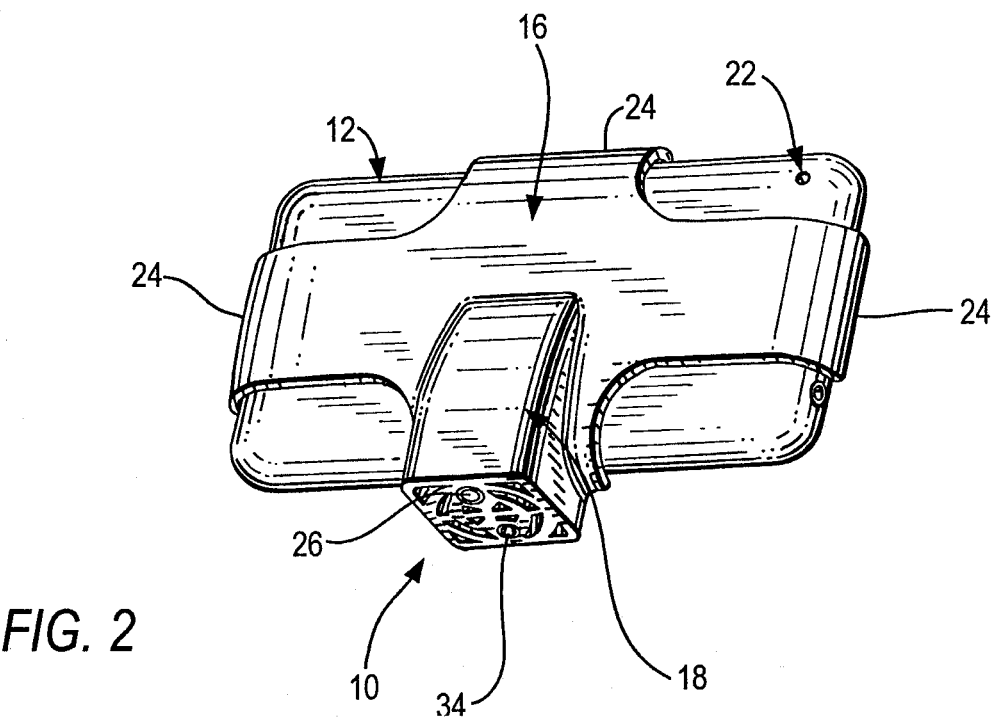
FIG. 2 is a rear perspective view of the stabilized mount of FIG. 1 in which the device is held.
Figure 3:
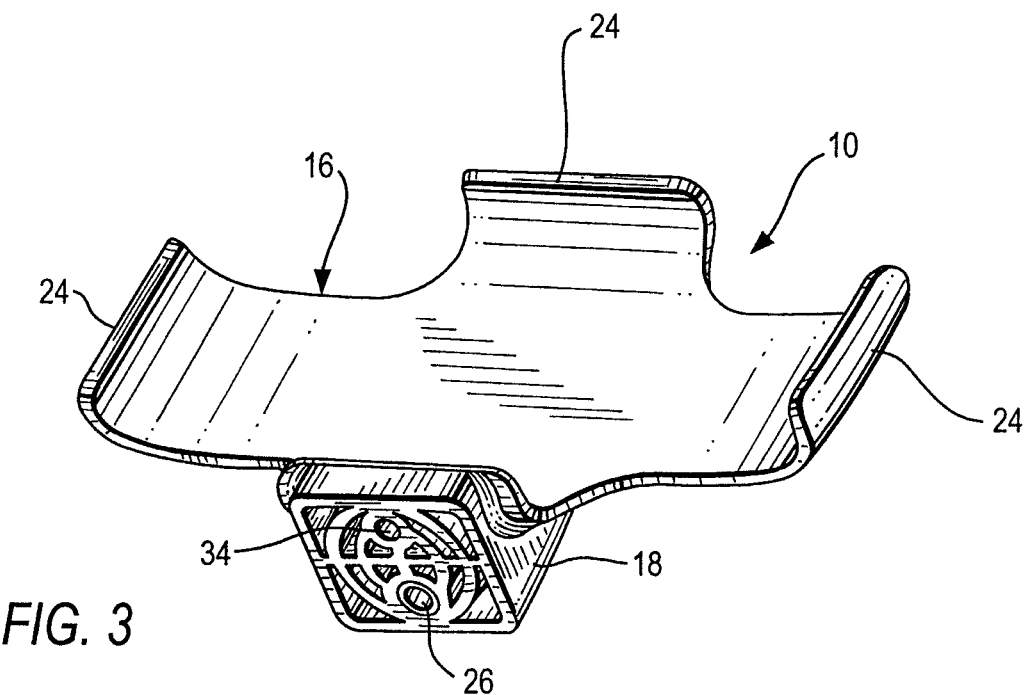
FIG. 3 is a front perspective view of the stabilized mount of FIG. 1 without the device.

As illustrated in FIGS. 1-2, the device 12 is advantageously an iPhone™, which is a multimedia smartphone marketed by Apple, Inc. This device 12 has an internal solid-state imager having a two-dimensional array of cells or photosensors arranged in the image plane. The photosensors correspond to image elements or pixels in a field of view of the imager. The imager may be a charge coupled device (CCD) or a complementary metal oxide semiconductor (CMOS) device, together with associated bandpass spectral filters and electronic circuits for producing electrical signals corresponding to a two-dimensional array of pixel information over the field of view. This device 12 also has a viewfinder display 20 that is parallel to the image plane, as well as an aperture 22 (see FIG. 2) through which light passes to the imager. Other smartphones could equally well be used.

The mount 10 includes a holder 16 for holding the device 12 during image capture, and a base 18 integral with, or connected to, the holder 16. The base 18 is fixed and immovable relative to the holder and has a bottom surface that lays in a base plane perpendicular to the image plane when the base 18 is supported by the support 14 in a supported orientation. The base 18 is operative for steadily positioning the holder 16 and the device 12 on the support 14 in the supported orientation during the image capture. The capability of rigidly fixing the orientation or image plane of the handheld device 12 with respect to the support 14 avoids the capture of blurry images.

Advantageously, the holder 16 has a plurality of four arms 24 for detachably gripping a periphery of the device 12. The arms 24 grip upper, lower and opposite side edges of the device 12 and clamp the device 12 in place. Preferably, the arms 24 are curved at their ends and are constituted of a resilient material, such as synthetic plastic or metal, that yield to enable the device 12 to be snap-fitted to the holder 16 by snap action. The arms 24 are spaced away from the aperture 22, and do not block or obstruct the field of view, or interfere with any functions of the device 12, e.g., buttons, connector ports, battery replacement. The holder 16 may be customized to hold one or more similar physical models of the device 12, or may be adapted to hold a plurality of different devices 12. The customized mount 10 can be sold separately from, or in conjunction with, a specific model of the device 12. The holder 16 may be provided with integral weights for balance.

The base 18 is advantageously provided with an insert 26 having an internally threaded passage for threaded engagement with an externally threaded stud 28 (see FIG. 6) extending away from the support 14 in the supported orientation during the image capture. The stud 28 is preferably an industry standard ¼ inch-20 threaded mounting stud to enable the mount 10 to be readily mounted on industry standard camera and video equipment mounting platforms, such as tripods 30 (see FIG. 5) and/or handheld equipoising supports 32 or 40 (see FIGS. 7-9). In a variant construction, the base 18 may be formed with a slanted dovetail surface that mates with a complementary contoured surface on the support 14 for easy removal and replacement.

The base 18 is also advantageously provided with an anti-rotation index hole 34 for receiving an index pin 36 (see FIG. 6) extending away from the support 14 in the supported orientation during the image capture. This feature insures that the handheld device 12 is mounted and maintained without rotation in the correct orientation with respect to the supports or camera mounting equipment 30, 32 and 40 (see FIGS. 8-9). Unwanted rotation or movement of the handheld device 12 during abrupt movements or re-positioning of the equipment 30, 32 and 40 is prevented. The holder 16 and the base 18 are illustrated as, but need not be, mirror symmetrical relative to a central plane, and the insert 26 and the index hole 34 preferably lay in the central plane. The insert 26 and the index hole 34 are mutually arranged in a predetermined relationship that matches that of the stud 28 and the index pin 36. The holder 16 may also be designed such that it is off axis with respect to the base 18 to accommodate special mounting requirements, or to align the optical centerline of the device 12 to the geometrical centerline of the mount 10.

The mount 10 supports the device 12 in a low mass, compact mounting profile. Without this capability, the mounting of the handheld device 12 might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

Figure 8:
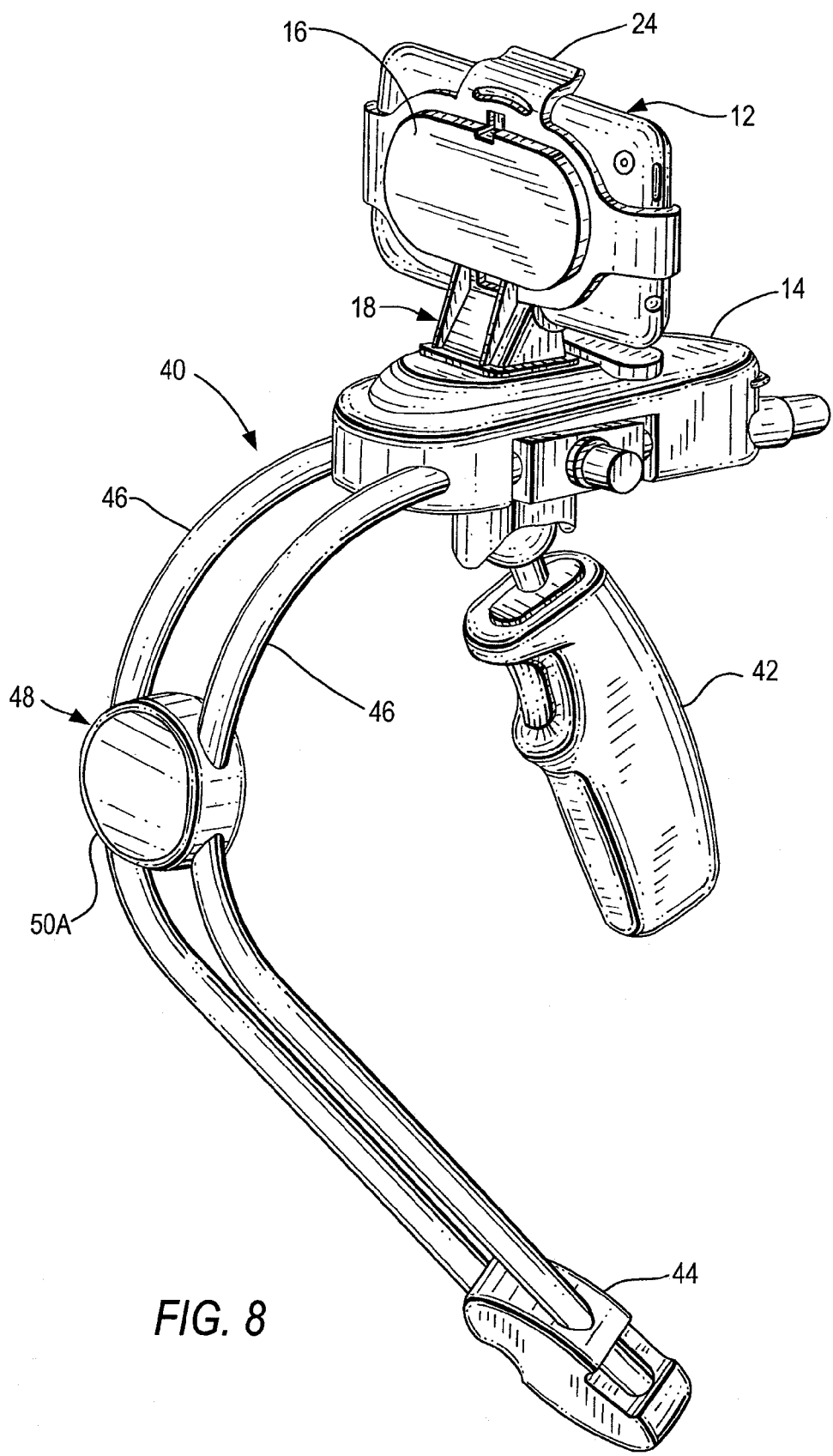
FIG. 8 is a reduced-scale, perspective view of a mounting arrangement for balancing the device held by the stabilized mount of FIG. 1 and mounted on another embodiment of a handheld equipoising support structure in accordance with this invention.
Figure 9:
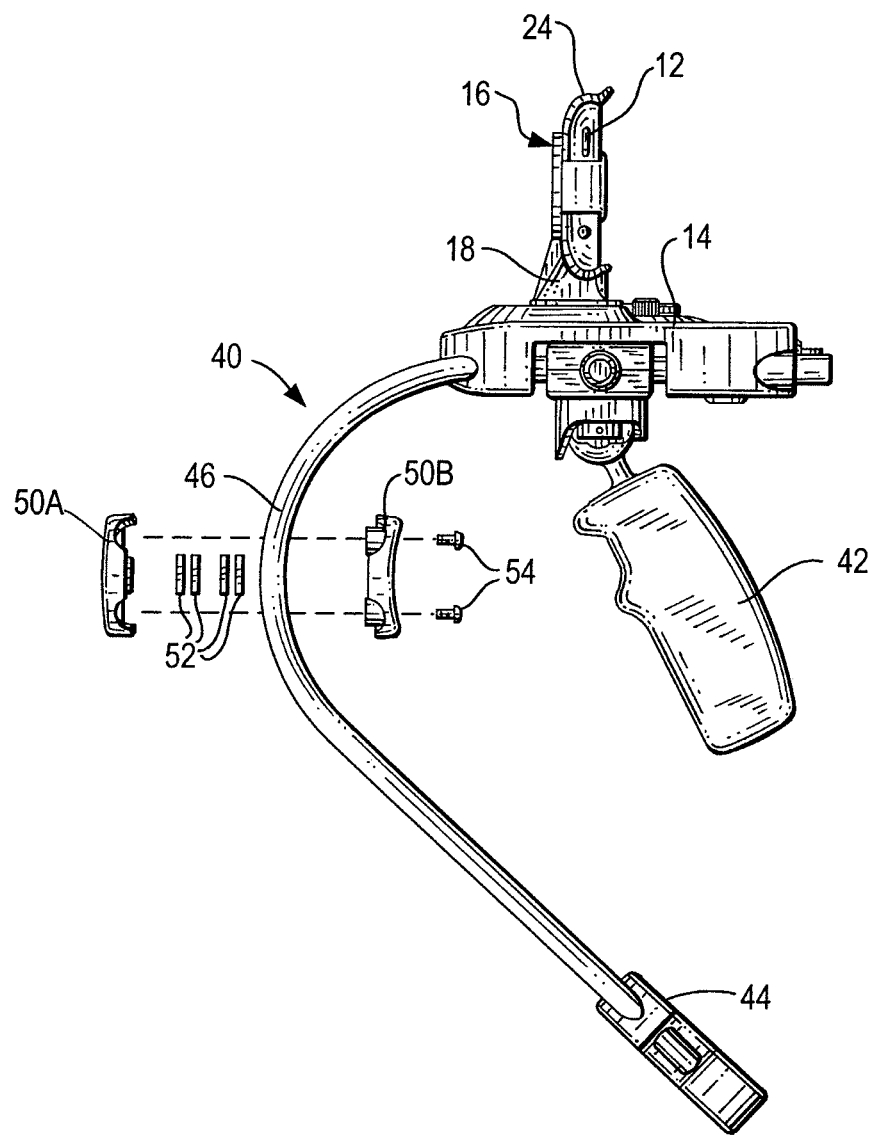
FIG. 9 is a partly-exploded, side elevational view of FIG. 8.

Referring now to FIGS. 8-9, reference numeral 40 generally identifies a preferred embodiment of a handheld equipoising support structure. The structure 40 includes a grip or handle 42 for holding by a human operator, a bottom counterweight 44 adjustably or fixedly mounted below a platform support 14, and an arcuate arm 46 extending along a large radius of curvature between and connecting the handle 42 with the counterweight 44. The arcuate arm 46 is preferably configured as a single, bent rigid tube, preferably made of aluminum, and formed into a pair of arcuate arm portions. A weight component 48 is mounted on, and slidable relative to and along, the arcuate arm portions 46. A plurality of ballast weights is advantageously supported by, and preferably within, the platform support 14 to balance the entire mounting arrangement about a center of gravity. The ballast weights not only add weight, but also add rotational stability, and thus compensate for the very low weight of the device 12 and make the device 12 less susceptible to unwanted motion.

The weight component 48 may be a single mass or block, but preferably, as shown, is an assembly that includes a pair of housing portions 50A, 50B bounding an internal compartment in which a plurality of balancing weight(s) 52 is mounted. Fasteners 54 capture the balancing weight(s) 52 inside the housing portions 50A, 50B and mount the component 48 on the arcuate arm portions 46. The housing portions 50A, 50B form internal passages along which the component 48 is slidable and adjusted to a desired position. The component 48 can stay in the desired adjusted position by friction and/or the fasteners 54 can be tightened to clamp the housing portions 50A, 50B onto the arcuate arm portions 46.

Thus, the entire balancing weight component 48 can be raised and lowered in elevation to offset the vertical balance position of the arrangement such that minor deviations in the manufacture of the various components can be compensated for while maintaining balance. In addition, the balancing weight component 48 can be positioned to alter the "drop time" of the arrangement so that the feel and operation of the arrangement can be changed to suit each operator's individual preference and to help compensate for environmental conditions (e.g., windy days) by making the arrangement more bottom heavy and less prone to such external influences as wind. Moving the balancing weight(s) 52, which have been precisely selected to achieve dynamic balance of the arrangement, along a continuous arc section, i.e., the arcuate arm portions 46, of the structure 40 makes this possible. Also, with the balancing weight(s) 52 moving along a large radius of curvature, the fore-aft balance position is only altered slightly in the arrangement as the balancing weight(s) 52 are slid along the arcuate arm portions 46. A fore-aft positioning screw located on the platform support 14 can compensate for the alteration in the fore-aft balance position.

In a variant construction, a pair of balancing weight components or assemblies could be independently mounted on, and guided by, the arcuate arm portions 46, one component or assembly for each arm portion, and independently moved in the same or opposite directions along the arm portions 46. One component or assembly could be adjusted to correct for the fore-aft weight balance position, and the other component or assembly could be adjusted to correct for the vertical weight balance position.

It will be understood that each of the elements described above, or two or more together, also may find a useful application in other types of constructions differing from the types described above.

While the invention has been illustrated and described as embodied in a balanced mounting arrangement for stably supporting a motion-sensitive, image capture device on a support, it is not intended to be limited to the details shown, since various modifications and structural changes may be made without departing in any way from the spirit of the present invention. For example, the arm portions need not extend through internal passages within housing portions, and the weight component can be mounted directly in front of, or at the rear of, the curved arm.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A balanced mounting arrangement for stably supporting a motion-sensitive, image capture device, the arrangement comprising:
   a mount for holding the device during image capture;
   a handheld equipoising structure having a support platform on which the mount and the held device are mounted during image capture, a bottom counterweight below the platform, and a curved arm extending along an arcuate path between the platform and the counterweight, the bottom counterweight being a discrete component stationarily mounted on the curved arm; and a weight component mounted on, and movable relative to the bottom counterweight and along the curved arm, the weight component changing in elevation during movement along the curved arm to adjust a vertical balance position of the arrangement, the weight component including a housing having an interior containing at least one balancing weight, and the curved arm extending through the interior of the housing.

2. The balanced mounting arrangement of claim 1, wherein the mount includes a holder having a plurality of arms for detachably gripping a periphery of the device, and a base immovable relative to the holder and supported by the support platform.

3. The balanced mounting arrangement of claim 2, wherein the holder is customized to hold a single physical model of the device.

4. The balanced mounting arrangement of claim 1, wherein the equipoising structure includes a handle connected to the support platform.

5. The balanced mounting arrangement of claim 1, wherein the curved arm extends forwardly and downwardly relative to the platform along a large radius of curvature.

6. The balanced mounting arrangement of claim 1, wherein the housing contains a plurality of balancing weights.

7. The balanced mounting arrangement of claim 1, wherein the curved arm has a pair of curved arm portions, and wherein the housing has a pair of passages through which the curved arm portions extend.

8. The balanced mounting arrangement of claim 1, wherein the housing has a pair of housing portions at opposite sides of the curved arm, and a fastener for securing the housing portions onto the curved arm in a fixed position after movement of the weight component.

9. The balanced mounting arrangement of claim 1, wherein the weight component is movable between the platform and the bottom counterweight.

10. A method of stably supporting a motion-sensitive, image capture device, the method comprising the steps of:

holding the device during image capture with a mount;

supporting the mount and the held device during image capture on a support platform of a handheld equipoising structure having a bottom counterweight below the platform, and a curved arm extending along an arcuate path between the platform and the counterweight, the bottom counterweight being a discrete component stationarily mounted on the curved arm; and mounting a weight component on, and moving the weight component relative to the bottom counterweight and along the curved arm, and changing the weight component in elevation during movement along the curved arm to adjust a vertical balance position, by containing at least one balancing weight in an interior of a housing, and by routing the curved arm through the interior of the housing.

11. The method of claim 10, wherein
the holding step is performed by detachably gripping a periphery of the device.

12. The method of claim 10, wherein the holding step is performed by holding a single physical model of the device.

13. The method of claim 10, and holding the equipoising structure with a handle connected to the support platform.

14. The method of claim 10, wherein the moving step is performed by moving the weight component along a large radius of curvature that extends forwardly and downwardly relative to the platform.

15. The method of claim 10, wherein the mounting step is performed by containing a plurality of balancing weights in a the housing.

16. The method of claim 10, and configuring the curved arm with a pair of curved arm portions, and forming the housing with a pair of passages through which the curved arm portions are routed.

17. The method of claim 10, and configuring the housing with a pair of housing portions at opposite sides of the curved arm, and securing the housing portions onto the curved arm in a fixed position after movement of the weight component.

18. The method of claim 10, and moving the weight component between the platform and the bottom counterweight.

* * * * *